United States Patent
Shonk

(10) Patent No.: US 12,426,536 B2
(45) Date of Patent: Sep. 30, 2025

(54) CENTER PIVOT MOWER SYSTEM WITH END OF ROW MOWER ADJUSTMENT

(71) Applicant: CNH Industrial America LLC, New Holland, PA (US)

(72) Inventor: Jason L. Shonk, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 763 days.

(21) Appl. No.: 17/564,877

(22) Filed: Dec. 29, 2021

(65) Prior Publication Data

US 2023/0200295 A1     Jun. 29, 2023

(51) Int. Cl.
| | |
|---|---|
| A01D 34/66 | (2006.01) |
| A01D 43/00 | (2006.01) |
| A01D 57/28 | (2006.01) |
| A01D 101/00 | (2006.01) |

(52) U.S. Cl.
CPC ......... *A01D 34/667* (2013.01); *A01D 34/664* (2013.01); *A01D 43/006* (2013.01); *A01D 57/28* (2013.01); *A01D 2101/00* (2013.01)

(58) Field of Classification Search
CPC .. A01D 34/667; A01D 34/664; A01D 43/006; A01D 57/28; A01D 2101/00; A01B 69/004
USPC .......................................................... 701/50
See application file for complete search history.

(56) References Cited

U.S. PATENT DOCUMENTS

| | | | |
|---|---|---|---|
| 1,044,744 A | 11/1912 | Caswell et al. | |
| 1,297,628 A | 3/1919 | Wodham | |
| 1,939,830 A | 12/1933 | Paul | |
| 2,203,981 A | 6/1940 | Coultas | |
| 2,370,468 A | 2/1945 | Hyland | |
| 2,552,770 A | 5/1951 | D'Artenay | |
| 4,304,086 A | 12/1981 | Stuchl | |
| 4,344,639 A | 8/1982 | Pollard | |

(Continued)

FOREIGN PATENT DOCUMENTS

| | | |
|---|---|---|
| EP | 1 321 027 A1 | 6/2003 |
| EP | 2 082 637 B1 | 7/2009 |

(Continued)

OTHER PUBLICATIONS

Extended European Search Reports prepared for EP application 22213101.3 dated Jun. 2, 2023 (7 pages).

*Primary Examiner* — Andrew R Dyer

(74) *Attorney, Agent, or Firm* — Buchanan Ingersoll & Rooney PC

(57) ABSTRACT

An agricultural mower system includes a towing vehicle and a mower. The towing vehicle has a tongue coupler. The mower includes a tongue pivotably coupled to the tongue coupler so the mower is on a first side of a towing centerline. A towing angle is defined with respect to the towing centerline. A tongue actuator is coupled to the tongue to pivot the tongue. A towing angle sensor outputs a towing angle signal. A controller is configured to: (i) determine the towing vehicle has initiated an end-of-row turning operation; and (ii) output an adjustment signal to the tongue actuator responsively to determining the end-of-row turning operation has initiated so the tongue actuator moves the tongue such that the mower defines the towing angle on a second side of the towing centerline by a conclusion of the end-of-row turning operation.

16 Claims, 4 Drawing Sheets

(56) References Cited

U.S. PATENT DOCUMENTS

| | | | |
|---|---|---|---|
| 4,478,026 A | 10/1984 | Mullet et al. | |
| 4,662,161 A | 5/1987 | Patterson | |
| 5,412,929 A | 5/1995 | Urbain et al. | |
| 6,082,085 A * | 7/2000 | Stelzer | A01D 67/005 56/6 |
| 6,804,597 B1 | 10/2004 | Posselius et al. | |
| 8,256,198 B2 * | 9/2012 | Thompson | A01D 34/661 180/53.3 |
| 9,408,344 B1 * | 8/2016 | Langenfeld | B62D 61/065 |
| 2006/0174599 A1 | 8/2006 | Hironimus | |
| 2006/0191250 A1 | 8/2006 | Neuerburg et al. | |
| 2006/0282205 A1 * | 12/2006 | Lange | G01C 21/20 701/50 |
| 2010/0006308 A1 * | 1/2010 | Schmidt | A01B 69/004 172/1 |
| 2014/0083071 A1 * | 3/2014 | Fay, II | A01D 45/00 56/14.7 |
| 2015/0068177 A1 * | 3/2015 | Harkcom | A01D 34/00 56/15.5 |
| 2015/0342110 A1 | 12/2015 | Peake et al. | |
| 2017/0050480 A1 * | 2/2017 | Perez | B60D 1/1675 |
| 2017/0322559 A1 * | 11/2017 | Fukuda | G05D 1/0246 |
| 2020/0084960 A1 * | 3/2020 | Aposhian | A01D 34/008 |
| 2021/0127551 A1 | 5/2021 | Priepke et al. | |

FOREIGN PATENT DOCUMENTS

| | | |
|---|---|---|
| FR | 2 857 560 A3 | 1/2005 |
| FR | 2 904 180 A1 | 2/2008 |
| JP | 2001301636 A | 10/2001 |
| JP | 2007191139 A | 8/2007 |

\* cited by examiner

CENTER PIVOT MOWER SYSTEM WITH END OF ROW MOWER ADJUSTMENT

FIELD OF THE INVENTION

The present invention pertains to agricultural vehicles and, more specifically, to agricultural mowers.

BACKGROUND OF THE INVENTION

Mowers and mower-conditioners are often employed to cut hay and/or other standing plants, such as grass, in a field. A typical mower system includes a towing vehicle, which may be a tractor or similar vehicle, that pulls a mower and/or mower-conditioner.

Many mower systems utilize so-called "offset" mowers or mower-conditioners where the mower or mower-conditioner is not carried directly behind the towing vehicle, i.e. a centerline of the mower or mower-conditioner is parallel but offset from a centerline of the towing vehicle. The mower or mower-conditioner is coupled to the towing vehicle by a pivotable tongue, which can pivot during turns. During turns, it can be difficult for a user to efficiently control all aspects of the mower or mower-conditioner so there is as little underlap of uncut crop material or overlap of cut crop material as possible.

What is needed in the art is a way to efficiently control a mower or a mower-conditioner during a turn of the towing vehicle.

SUMMARY OF THE INVENTION

Exemplary embodiments disclosed herein provide an agricultural mower system with a controller that can determine a towing vehicle has initiated an end-of-row turning operation and output a signal so a tongue is moved to an opposite side by a conclusion of the end-of-row turning operation.

In some exemplary embodiments provided according to the present disclosure, an agricultural mower system includes: a towing vehicle including an engine and a tongue coupler, the towing vehicle defining a towing centerline; a mower including a frame carrying a plurality of cutters and pivotably coupled to a tongue that is pivotably coupled to the tongue coupler so the mower is on a first side of the towing centerline, the tongue defining a towing angle with respect to the towing centerline; a tongue actuator coupled to the tongue and configured to pivot the tongue relative to the towing centerline; a towing angle sensor associated with the tongue and configured to output a towing angle signal corresponding to the towing angle; and a controller operably coupled to the towing angle sensor and the tongue actuator. The controller is configured to: determine the towing vehicle has initiated an end-of-row turning operation; and output at least one adjustment signal to the tongue actuator responsively to determining the end-of-row turning operation has initiated so the tongue actuator moves the tongue such that the mower defines the towing angle on a second side of the towing centerline opposite the first side by a conclusion of the end-of-row turning operation.

In some embodiments, a method of adjusting a mower of an agricultural mower system is provided. The agricultural mower system includes a towing vehicle, the mower, and a controller. The towing vehicle includes an engine and a tongue coupler and defines a towing centerline. The mower includes a frame carrying a plurality of cutters and is pivotably coupled to a tongue that is pivotably coupled to the tongue coupler so the mower is on a first side of the towing centerline, the tongue defining a towing angle with respect to the towing centerline. The method is performed by the controller and includes: determining the towing vehicle has initiated an end-of-row turning operation; and outputting at least one adjustment signal to a tongue actuator responsively to determining the end-of-row turning operation has initiated so the tongue actuator moves the tongue such that the mower defines the towing angle on a second side of the towing centerline opposite the first side by a conclusion of the end-of-row turning operation.

One possible advantage that may be realized by exemplary embodiments disclosed herein is that the controller can cause the tongue to move to the other side of the centerline while the operator controls the towing vehicle through the end-of-row turning operation, allowing the operator to focus on turning and increasing safety.

Another possible advantage that may be realized by exemplary embodiments disclosed herein is that the controller can also control turning of the towing vehicle during the end-of-row turning operation, allowing autonomous operation.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
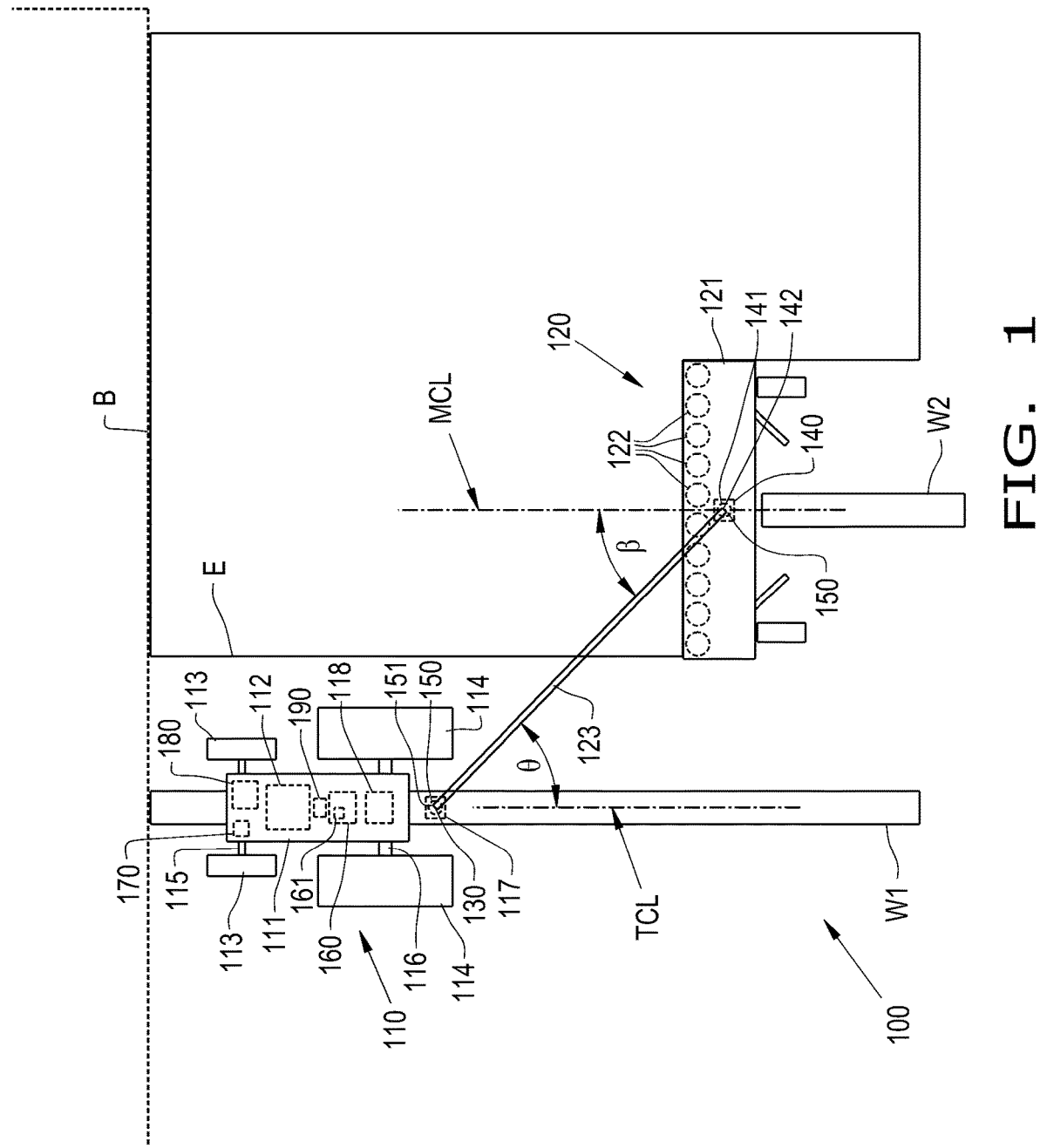
FIG. 1 illustrates a top view of an exemplary embodiment of an agricultural mower system provided according to the present disclosure while a towing vehicle and a mower of the system are traveling through a field in a first direction.

Referring now to the drawings, and more particularly to FIG. 1, an exemplary embodiment of an agricultural mower system 100 including a towing vehicle 110 and a mower 120 is illustrated. The towing vehicle 110 includes a chassis 111 and an engine, such as an internal combustion engine (ICE) 112, to provide motive force to a plurality of wheels 113, 114. Some of the wheels, such as front wheels 113, may be coupled to the chassis 111 by a steerable front axle 115 while the rear wheels 114 are coupled to the chassis 111 by a fixed rear axle 116. It should be appreciated that, alternatively, the front axle 115 may be a fixed axle and/or the rear axle 116 may be a steerable axle. The towing vehicle 110 includes a tongue coupler 117 to which a tongue is pivotably coupled, as will be described further herein. The towing vehicle 110 defines a towing centerline TCL. As illustrated, the towing vehicle 110 is in the form of a tractor, but it should be appreciated that the towing vehicle 110 may be other types of vehicles. The towing vehicle 110 may travel along a cleared section of a field, such as along a first windrow of cut crops W1, so the towing vehicle 110 does not knock down or otherwise damage crops in the field.

The mower 120 includes a frame 121 carrying a plurality of cutters 122 that is pivotably coupled to a tongue 123 that is pivotably coupled to the tongue coupler 117 of the towing vehicle 110 so the mower 120 is on a first side of the towing centerline TCL. In this respect, the tongue 123 pivotably couples the frame 121 to the towing vehicle 110 while also being pivotable with respect to the frame 121, as will be described further herein. The frame 121 defines a mower centerline MCL that is offset from the towing centerline TCL, as illustrated, so the mower centerline MCL is not coaxial with the towing centerline TCL. The tongue 123 defines a towing angle $\theta$ with respect to the towing centerline TCL and a mower angle $\beta$ with respect to the mower centerline MCL, as illustrated. As the mower 120 is carried along an edge E of standing crops, the mower 120 cuts crops and directs the cut crop material into a windrow, illustrated as a forming windrow W2, until the mower 120 reaches a boundary B of the field, at which point the mower 120 is traveling through what is referred to as "headlands." It should be appreciated that while the term "mower" is used to refer to the element 120, the term "mower" 120 also encompasses what is commonly referred to as a "mower-conditioner," which includes a conditioning mechanism, e.g., a flail conditioner or a pair of conditioning rolls, to condition cut crop material.

As illustrated in FIG. 1, the towing vehicle 110 and the mower 120 are traveling in a straight line path so the towing centerline TCL and the mower centerline MCL are parallel with one another. The relative orientation of the towing vehicle 110 and the mower 120 illustrated in FIG. 1 corresponds to when the towing vehicle 110 is towing the mower 120 through rows of standing crop.

Figure 2:
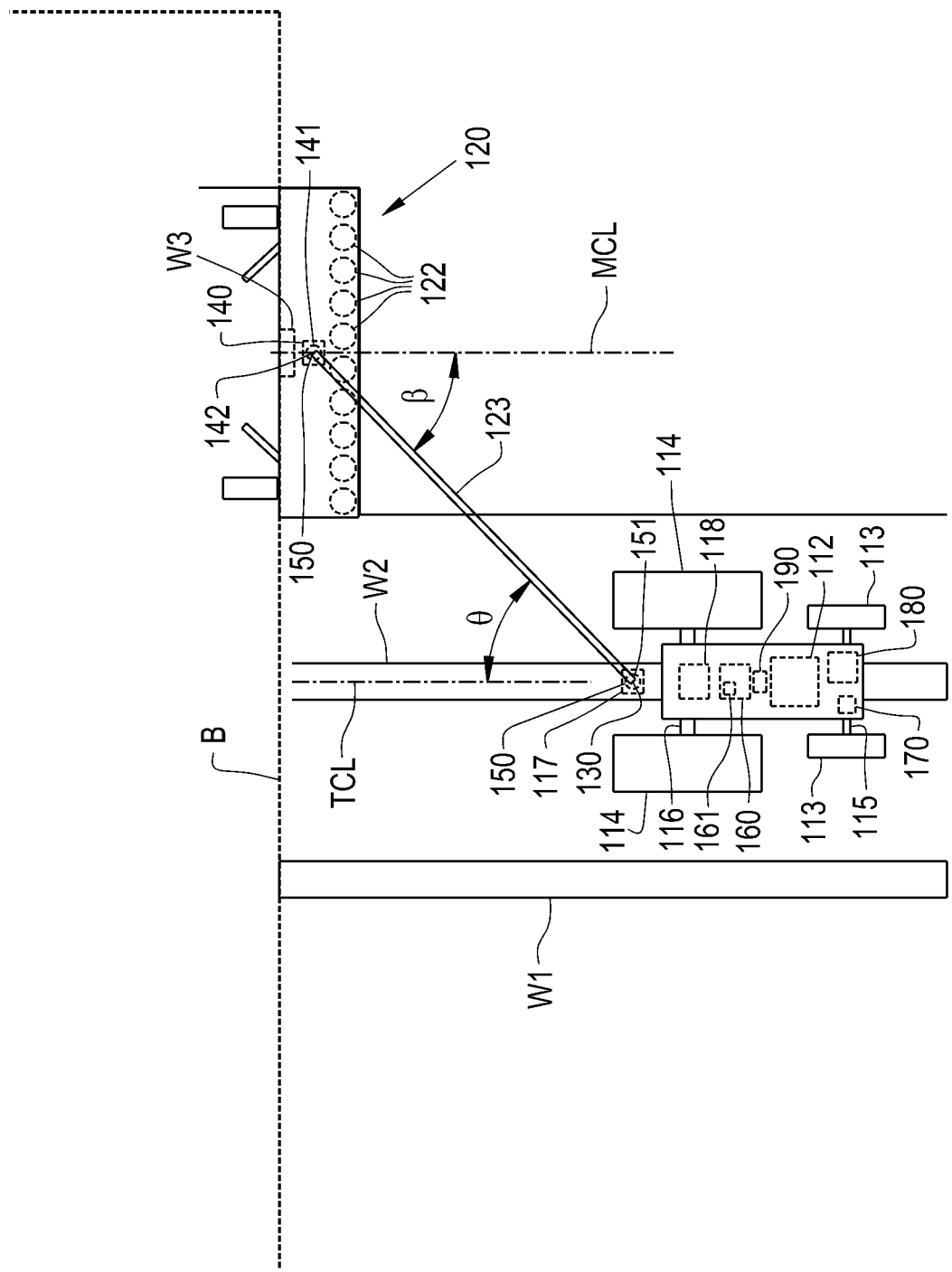
FIG. 2 illustrates a top view of the agricultural mower system of FIG. 1 when the towing vehicle and the mower are traveling through the field in a second direction after the towing vehicle and the mower have turned around.

Mower systems are generally operated in fields where the system will cut crop material in passes, i.e., along rows ("swaths"). As the mower 120 reaches the end of a row, the towing vehicle 110 must initiate an end-of-row turn operation to turn the towing vehicle 110 and the mower 120 around 180° so the mower 120 can engage standing crops in the field, as illustrated in FIG. 2, to form a new windrow W3. To avoid damaging standing crops, the mower 120 is also moved to a second side of the towing centerline TCL opposite the first side so the towing vehicle 110 does not travel through standing crops and instead travels along a previously cut section of the field, such as along the windrow W2.

A tongue actuator 130 is coupled to the tongue 123 and is configured to pivot the tongue 123 relative to the towing centerline TCL. The tongue actuator 130 may be, for example, a hydraulic cylinder, an electric actuator, a pneumatic actuator, etc. The tongue actuator 130 may move the tongue 123 to move the mower 120 to the second side from the first side of the towing centerline TCL, and vice versa, so the towing vehicle 110 is generally traveling in cut sections of the field while the mower 120 is carried through standing crops.

In known mower systems, the operator generally is responsible for both steering the towing vehicle during an end-of-row turning operation and also controlling the tongue actuator to move to the tongue to the opposite side of the towing centerline. Controlling both aspects of the operation is difficult for the operator and can also be inefficient if, for example, the operator needs to increase the size of the turn and/or slow down operation to perform both functions. Further, the operator needing to focus on controlling the tongue actuator may distract the operator from driving the towing vehicle, which can be a safety hazard.

Figure 3:
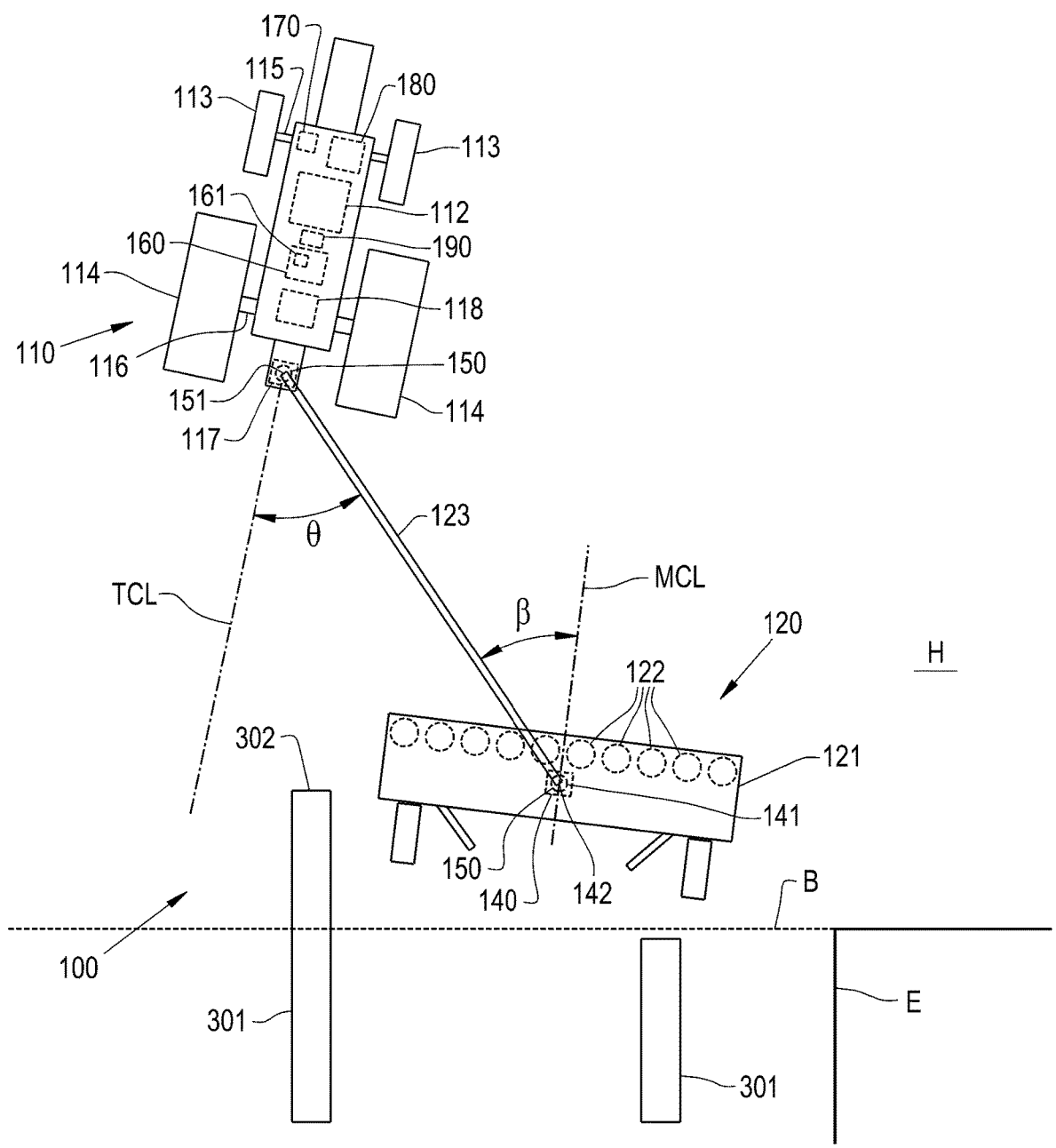
FIG. 3 illustrates a top view of the agricultural mower system of FIGS. 1-2 when the towing vehicle is turning and a tongue has been moved to move the mower to an opposite side of a towing centerline.

To address some of the previously described issues, and referring now to FIG. 3 as well, the agricultural mower system 100 includes a towing angle sensor 150 that is associated with the tongue 123 and configured to output a towing angle signal corresponding to the towing angle $\theta$. The towing angle sensor 150 may be, for example, associated with a pivot 151 of the tongue 123 that is carried by the towing vehicle 110. A controller 160, which may be carried by the towing vehicle 110, is operably coupled to the towing angle sensor 150 and the tongue actuator 130. The controller 160 is configured to determine the towing vehicle 110 has initiated an end-of-row turning operation and output at least one adjustment signal to the tongue actuator 130 responsively to determining the end-of-row turning operation has initiated so the tongue actuator 130 moves the tongue 123 such that the mower 120 defines the towing angle $\theta$ on the second side of the towing centerline TCL, which is opposite the first side, by a conclusion of the end-of-row turning operation. The towing angle $\theta$ on the second side may be the same towing angle $\theta$ as on the first side. The controller 160 thus controls side-to-side movement of the tongue 123, via control of the tongue actuator 130 during the end-of-row turning operation, so the mower 120 is moved to the correct side of the towing centerline TCL to engage standing crops regardless of which direction the towing vehicle 110 is traveling in the field. The controller 160 controlling side-to-side movement of the tongue 123 during the end-of-row turning operation allows the operator to focus on turning the towing vehicle 110 and the mower 120 through the end-of-row turning operation, which can increase operator comfort and safety.

The controller 160 may be configured to determine the towing vehicle 110 has initiated the end-of-row turning operation in a variety of ways. In some embodiments, the controller 160 is coupled to a turn angle sensor 170 that is associated with at least one steerable wheel, such as one of the steerable front wheels 113 and/or the steerable axle 115, and is configured to output a turn angle signal that corresponds to a turn angle of the at least one steerable wheel 113. The controller 160 may be configured to determine the towing vehicle 110 has initiated the end-of-row turning operation based at least partially on the turn angle signal. For example, the controller 160 may be configured to determine the towing vehicle 110 has initiated the end-of-row turning operation if the turn angle signal exceeds a defined turn angle value for a defined time period, which may indicate that the towing vehicle 110 is being turned around to pass through another row of standing crops. The steerable wheels 113 turning is illustrated in FIG. 3, which shows the towing vehicle 110 steering through headlands H of the field, and the controller 160 has output the adjustment signal to the tongue actuator 130 so the tongue actuator 130 has started to move the tongue 123 toward the second side of the towing centerline TCL. To prevent the controller 160 from outputting the adjustment signal and causing the mower 120 to be moved during a wide turn, as opposed to an end-of-row turning operation, the controller 160 may be configured to only output the adjustment signal to the tongue actuator 130 if the controller 160 is in a cutting mode in which the controller 160 actively monitors the turn angle signal to determine if the towing vehicle 110 has initiated the end-of-row turning operation.

In some embodiments, the controller 160 is coupled to a steering mechanism 180 of the towing vehicle 110 that is associated with one or more steerable wheels, such as the steerable front wheels 113, via coupling to the steerable axle 115. The steering mechanism 180 can pivot the steerable axle 115 to steer the steerable wheels 113, which in turn causes turning of the towing vehicle 110. The controller 160 may control the steering mechanism 180 by outputting steering signals to the steering mechanism 180, allowing the controller 160 to control turning of the towing vehicle 110, which is known as "semi-autonomous" or "autonomous" guidance depending on the degree of control that the controller 160 has over the steering mechanism 180. The controller 160 may be configured to control the steering mechanism 180 by outputting steering signals so the towing vehicle 110 follows swaths, such as the swath 301 illustrated in FIG. 3, that are stored in a memory 161 of the controller 160, e.g.,. The swaths 301 may, for example, overlap the previously cut windrows W1, W2 so the towing vehicle 110 does not travel on uncut portions of the field. The swaths 301 may extend into headlands, with the swaths 301 ending when the mower 120 has traveled past the boundary B so the mower 120 is not cutting standing crops in the field. The controller 160 may be configured to determine the towing vehicle 110 has reached an end 302 of a swath 301 and output one or more steering signals to the steering mechanism 180 responsively to determining the towing vehicle 110 has reached the end 302 of the swath 301. The controller 160 may be configured to determine the towing vehicle 110 has initiated the end-of-row turning operation based at least partially on determining the towing vehicle 110 reaching the end 302 of the swath 301 and/or outputting the steering signal, which both indicate that the towing vehicle 110 has reached the end of the row and is turning around to engage the next row of standing crops.

In some embodiments, the towing vehicle 110 includes a display 190 that an operator may interact with to control various functions of the towing vehicle 110 and/or the mower 120. The display 190 may be operably coupled to the controller 160 and configured to output an end-of-row signal to the controller 160 upon, for example, an operator selecting an icon presented by the display 190. The operator may decide to select the icon, for example, right as the operator is about to begin turning the towing vehicle 110 and the mower 120 around to engage the next row of standing crops. The controller 160 may be configured to determine the towing vehicle 110 has initiated the end-of-row turning operation upon receiving the end-of-row signal from the display 190. In this respect, the operator can conveniently control when the controller 160 causes the tongue actuator 130 to move the tongue 123 so the mower 120 moves to the other side of the towing centerline TCL with a simple icon selection, allowing the operator to focus on turning the towing vehicle 110 during the end-of-row turning operation.

In some embodiments, the mower 120 includes a mower angle actuator 140 that is coupled to the tongue 123 and the frame 121 and configured to pivot the frame 121 with respect to the tongue 123. Similarly, the mower 120 may include a mower angle sensor 141 associated with a pivot 142 where the mower angle actuator 140 is coupled to the tongue 123 and the frame 121 in order to pivot the frame 121 with respect to the tongue 123. As can be seen in comparing FIGS. 1 and 2, the mower 120 defines a mower centerline MCL and the tongue 123 defines a mower angle $\beta$ relative to the mower centerline MCL. The mower angle actuator 140 is configured to pivot the frame 121 with respect to the tongue 123 to adjust the mower angle $\beta$. The mower angle sensor 141 is configured to output a mower angle signal to the controller 160, the mower angle signal corresponding to the mower angle $\beta$. The controller 160 may be configured to determine the mower angle $\beta$ has changed, based on the mower angle signal received from the mower angle sensor 141, and responsively output one or more mower angle adjustment signals to the mower angle actuator 140 to cause pivoting of the frame 121 with respect to the tongue 123 and adjustment of the mower angle $\beta$. In some embodiments, the controller 160 is configured to output the mower angle adjustment signal to the mower angle actuator 140 so the tongue 123 defines a defined mower angle $\beta$ when moved to a second side of the mower centerline MCL (illustrated in FIG. 2) that is opposite the first side of the mower centerline MCL, i.e., the mower angle $\beta$ may be the same on both sides of the mower centerline MCL. In this respect, the controller 160 can control the tongue actuator 130 to control the orientation of the tongue 123 and the mower 120 with respect to the towing vehicle 110 and control the mower angle actuator 140 to control the orientation of the frame 121 (and the mower 120) with respect to the tongue 123 during the end-of-row turning operation. Such a configuration automatically positions and orients the mower 120 during the end-of-row turning operation so the mower 120 is in the proper position and orientation to engage standing crops by the conclusion of the end-of-row turning operation while requiring little, if any, input from the operator. In some embodiments, the controller 160 is configured to output the at least one adjustment signal to the tongue actuator 130 and the mower angle adjustment signal to the mower actuator 140 such that the towing centerline TCL and the mower centerline MCL are parallel to one another by the conclusion of the end-of-row turning operation, as illustrated in FIGS. 1-2.

As previously described, the controller 160 can receive respective angle signals from the towing angle sensor 150 and the mower angle sensor 141 to determine the towing angle $\theta$ and the mower angle $\beta$, corresponding to the relative orientations of the towing vehicle 110 and the mower 120 with respect to the tongue 123. The controller 160 can thus be configured to monitor the towing angle $\theta$ and the mower angle $\beta$ to determine how the mower 120 is positioned relative to the towing vehicle 110 and output one or more adjustment signals to one or more respective actuators 130, 140 to properly position and orient the mower 120 during the end-of-row turning operation. The controller 160 may output the needed adjustment signal(s) and mower angle adjustment signal(s) based on received angle signals from the angle sensors 150, 141 and known geometric relationships of the system 100. Thus, it should be appreciated that the angle signals sent to the controller 160 from the angle sensors 141, 150 can dictate how the controller 160 outputs signals to the actuators 130, 140 to control the orientation and positioning of the tongue 123 and the mower 120 during an end-of-row turning operation.

The towing angle sensor 150 and the mower angle sensor 141 may be configured in a variety of ways to output the respective angle signals. In some embodiments, the towing angle sensor 150 and/or the mower angle sensor 141 is a rotary potentiometer that directly measures the angle at the respective pivot 142, 151 to output the respective angle signal corresponding to the measured angle. Such a configuration provides a relatively simple way for the controller 160 to monitor the angles. Alternatively, or in addition, the towing angle sensor 150 and/or the mower angle sensor 141 may be a position sensor associated with the respective pivot 142, 151 that measures a position of the pivot 142, 151 relative to a measuring point and outputs an angle signal that the controller 160 can use to determine the respective angle based on the measured distance and known geometric relationships. In some embodiments, the mower angle sensor 141 is incorporated in the mower angle actuator 140 and configured to output the mower angle signal corresponding to an extension of the mower angle actuator 140, e.g., an extension of an actuator rod of the mower angle actuator 140, which corresponds to the mower angle β. It should thus be appreciated that the angle sensors 141, 150 provided according to the present disclosure can output different types of angle signals that the controller 160 can use to control the towing system 100.

In some embodiments, the controller 160 is configured to output the at least one adjustment signal such that the tongue actuator 130 moves the tongue 123 at a constant rate during the end-of-row turning operation. The controller 160 may be configured to determine the rate at which the tongue actuator 130 moves the tongue 123 during the end-of-row turning operation in a variety of ways. For example, the controller 160 may receive the turn angle signal from the turn angle sensor 170 to determine the turn angle and determine a length of the end-of-row turning operation based on a turning radius of the towing vehicle 110 and the turn angle. The controller 160 may also determine a distance that the tongue actuator 130 needs to move the tongue 123 so the mower 120 is on the second side of the towing centerline TCL by the conclusion of the end-of-row turning operation. Once the controller 160 determines the length of the end-of-row turning operation and the distance that the tongue actuator 130 needs to move the tongue 123, the controller 160 can determine the rate at which the tongue actuator 130 moves the tongue 123. As previously described, the towing vehicle 110 and the mower 120 may be oriented with respect to one another such that the towing centerline TCL and the mower centerline MCL are parallel to one another by the conclusion of the end-of-row turning operation. The controller 160 may thus also be configured to output the mower angle adjustment signal to the mower angle actuator 140 so the mower angle actuator 140 pivots the mower 120 at a constant rate during the end-of-row turning operation so the mower centerline MCL is parallel to the towing centerline TCL by the conclusion of the end-of-row turning operation in a similar fashion by determining a pivot distance needed for the mower centerline MCL to be parallel to the towing centerline TCL and dividing that pivot distance by the length of the end-of-row turning operation.

From the foregoing, it should be appreciated that the controller 160 controls side-to-side movement of the tongue 123 and the mower 120 so the mower 120 can be moved to opposite sides of the towing centerline TCL before the conclusion of the end-of-row turning operation. The controller 160 may automatically determine the end-of-row turning operation has initiated based on various signal inputs or, additionally or alternatively, be manually signaled by the operator that the turning operation has initiated. Once the controller 160 determines the end-of-row turning operation has initiated, the operator no longer needs to be concerned with controlling movement of the tongue 123 and the mower 120. Thus, the controller 160 provided according to the present disclosure can automatically move the mower 120 side-to-side, when appropriate, if the controller 160 is autonomously controlling the towing vehicle 110 or, if the system is not autonomous, allow an operator to focus on turning the towing vehicle 110 around to position the mower 120 to engage the next row of standing crops.

Figure 4:
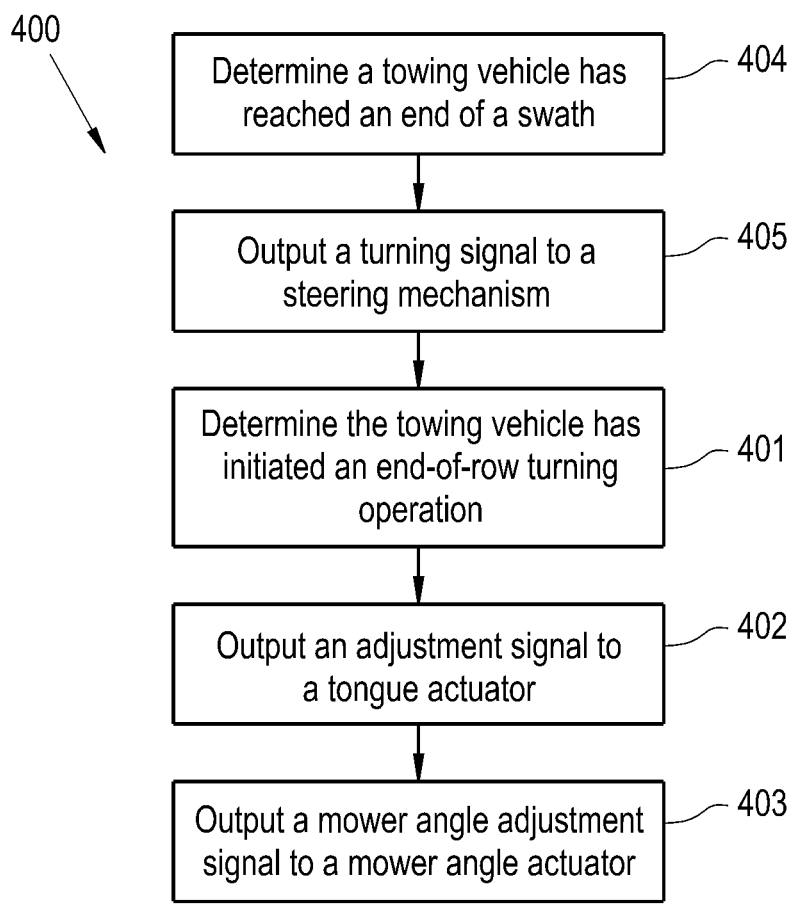
FIG. 4 is a flow chart illustrating an exemplary embodiment of a method of adjusting a mower of an agricultural mower system, provided in accordance with the present disclosure.

Referring now to FIG. 4, an exemplary embodiment of a method 400 of adjusting the mower 120 of the agricultural mower system 100 provided according to the present disclosure is illustrated. The method 400 is performed by the controller 160 and includes determining 401 the towing vehicle 110 has initiated an end-of-row turning operation and outputting 402 at least one adjustment signal to the tongue actuator 130 responsively to determining 401 the end-of-row turning operation has initiated so the tongue actuator 130 moves the tongue 123 such that the mower 120 defines the towing angle θ on the second side of the towing centerline TCL opposite the first side by the conclusion of the end-of-row turning operation. The method 400 may further include outputting 403 a mower angle adjustment signal to the mower angle actuator 140 so the tongue 123 defines the mower angle β when moved to the second side of the mower centerline MCL opposite the first side of the mower centerline MCL. In some embodiments, outputting 402 the at least one adjustment signal causes the tongue actuator 130 to move the tongue 123 at a constant rate during the end-of-row turning operation.

Determining 401 the towing vehicle 110 has initiated the end-of-row turning operation may be done in a variety of ways. In some embodiments, determining 401 the towing vehicle 110 has initiated the end-of-row turning operation is based at least partially on the previously described turn angle signal. In some embodiments, such as when the controller 160 autonomously controls the towing vehicle 110, the method 400 further includes determining 404 the towing vehicle 110 has reached the end 302 of a swath 301 and outputting 405 a turning signal to the steering mechanism 180 responsively to determining 404 the towing vehicle 110 has reached the end 302 of the swath 301. Determining 401 the towing vehicle 110 has initiated the end-of-row turning operation is based at least partially on determining 404 the towing vehicle 110 has reached the end of the swath 301 and/or outputting 405 the turning signal. In some embodiments, determining 401 the towing vehicle 110 has initiated the end-of-row turning operation includes receiving the end-of-row signal from the display 190, as previously described.

It is to be understood that the steps of the method 400 may be performed by the controller 160 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 160 described herein, such as the method 400, is implemented in software code or instructions which are tangibly stored on a tangible computer readable medium. The controller 160 loads the software code or instructions via a direct interface with the computer readable medium or via a wired and/or wireless network. Upon loading and executing such software code or instructions by the controller 160, the controller 160 may perform any of the functionality of the controller 160 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A method of adjusting a mower of an agricultural mower system, the agricultural mower system comprising a towing vehicle, the mower, and a controller, the towing vehicle comprising an engine and a tongue coupler and defining a towing centerline, the mower comprising a frame carrying a plurality of cutters and pivotably coupled to a tongue that is pivotably coupled to the tongue coupler, the tongue defining a towing angle with respect to the towing centerline, the method being performed by the controller comprising:
   determining the towing vehicle has initiated an end-of-row turning operation; and
   outputting at least one adjustment signal to a tongue actuator, responsively to determining the end-of-row turning operation has initiated, moving the tongue, by the tongue actuator, from a position where the mower defines the towing angle on a first side of the towing centerline prior to initiation of the end-of-row turning operation to a position where the mower defines the towing angle on a second side of the towing centerline opposite the first side by a conclusion of the end-of-row turning operation.

2. The method of claim 1, wherein the mower comprises a mower angle actuator coupled to the tongue and the frame, the mower defining a mower centerline and the tongue defining a mower angle relative to the mower centerline on a first side of the mower centerline, the mower angle actuator being configured to pivot the frame with respect to the tongue and adjust the mower angle.

3. The method of claim 2, further comprising outputting a mower angle adjustment signal to the mower angle actuator causing the tongue to define the mower angle when moved to a second side of the mower centerline that is opposite the first side of the mower centerline.

4. The method of claim 1, wherein the at least one adjustment signal and the mower angle adjustment signal are output causing the towing centerline and the mower centerline to be parallel to one another by the conclusion of the end-of-row turning operation.

5. The method of claim 1, wherein outputting the at least one adjustment signal causes the tongue actuator to move the tongue at a constant rate during the end-of-row turning operation.

6. The method of claim 1, wherein the towing vehicle comprises at least one steerable wheel and a turn angle sensor associated with the at least one steerable wheel, operably coupled to the controller, and configured to output a turn angle signal corresponding to a turn angle of the at least one steerable wheel, wherein determining the towing vehicle has initiated the end-of-row turning operation is based at least partially on the turn angle signal.

7. The method of claim 1, wherein the towing vehicle comprises at least one steerable wheel and a steering mechanism associated with the at least one steerable wheel, operably coupled to the controller, and configured to turn the at least one steerable wheel responsively to receiving a turning signal from the controller, the method further comprising:
   determining the towing vehicle has reached an end of a swath; and
   outputting the turning signal to the steering mechanism responsively to determining the towing vehicle has reached the end of the swath, wherein determining the towing vehicle has initiated the end-of-row turning operation is based at least partially on at least one of determining the towing vehicle has reached the end of the swath or outputting the turning signal.

8. The method of claim 1, wherein the towing vehicle comprises a display operably coupled to the controller and configured to output an end-of-row signal to the controller, wherein determining the towing vehicle has initiated the end-of-row turning operation comprises receiving the end-of-row signal from the display.

9. An agricultural mower system, comprising:
   a towing vehicle comprising an engine and a tongue coupler, the towing vehicle defining a towing centerline;
   a mower comprising a frame carrying a plurality of cutters and pivotably coupled to a tongue that is pivotably coupled to the tongue coupler, the tongue defining a towing angle with respect to the towing centerline;
   a tongue actuator coupled to the tongue and configured to pivot the tongue relative to the towing centerline;
   a towing angle sensor associated with the tongue and configured to output a towing angle signal corresponding to the towing angle; and
   a controller operably coupled to the towing angle sensor and the tongue actuator, the controller being configured to:
   determine the towing vehicle has initiated an end-of-row turning operation;
   and output at least one adjustment signal to the tongue actuator, responsively to determining the end-of-row turning operation has initiated, moving the tongue, by the tongue actuator, from a position where the mower defines the towing angle on a first side of the towing centerline prior to initiation of the end-of-row turning operation to a position where the mower defines the towing angle on a second side of the towing centerline opposite the first side by a conclusion of the end-of-row turning operation.

10. The agricultural mower system of claim 9, wherein the mower comprises a mower angle actuator coupled to the tongue and the frame, the mower defining a mower centerline and the tongue defining a mower angle relative to the mower centerline on a first side of the mower centerline, the mower angle actuator being configured to pivot the frame with respect to the tongue and adjust the mower angle.

11. The agricultural mower system of claim 10, wherein the controller is configured to output a mower angle adjustment signal to the mower angle actuator causing the tongue to define the mower angle when moved to a second side of the mower centerline that is opposite the first side of the mower centerline.

12. The agricultural mower system of claim 9, wherein the controller is configured to output the at least one adjustment signal and the mower angle adjustment signal causing the towing centerline and the mower centerline to be parallel to one another by the conclusion of the end-of-row turning operation.

13. The agricultural mower system of claim 9, wherein the controller is configured to output the at least one adjustment signal causing the tongue actuator to move the tongue at a constant rate during the end-of-row turning operation.

14. The agricultural mower system of claim 9, wherein the towing vehicle comprises at least one steerable wheel and a turn angle sensor associated with the at least one steerable wheel, operably coupled to the controller, and configured to output a turn angle signal corresponding to a turn angle of the at least one steerable wheel, the controller being configured to determine the towing vehicle has initiated the end-of-row turning operation based at least partially on the turn angle signal.

15. The agricultural mower system of claim 9, wherein the towing vehicle comprises at least one steerable wheel and a steering mechanism associated with the at least one steerable wheel, operably coupled to the controller, and configured to turn the at least one steerable wheel responsively to receiving a turning signal from the controller, the controller being configured to:
  determine the towing vehicle has reached an end of a swath; and
  output the turning signal to the steering mechanism responsively to determining the towing vehicle has reached the end of the swath, wherein the controller is configured to determine the towing vehicle has initiated the end-of-row turning operation based at least partially on at least one of determining the towing vehicle has reached the end of the swath or outputting the turning signal.

16. The agricultural mower system of claim 9, wherein the towing vehicle comprises a display operably coupled to the controller and configured to output an end-of-row signal to the controller, the controller being configured to determine the towing vehicle has initiated the end-of-row turning operation upon receiving the end-of-row signal.

* * * * *